Dec. 15, 1925.
A. H. LEIPERT ET AL
1,566,026
CUSHION CONNECTION FOR VEHICLE CONSTRUCTION
Filed Sept. 5, 1924
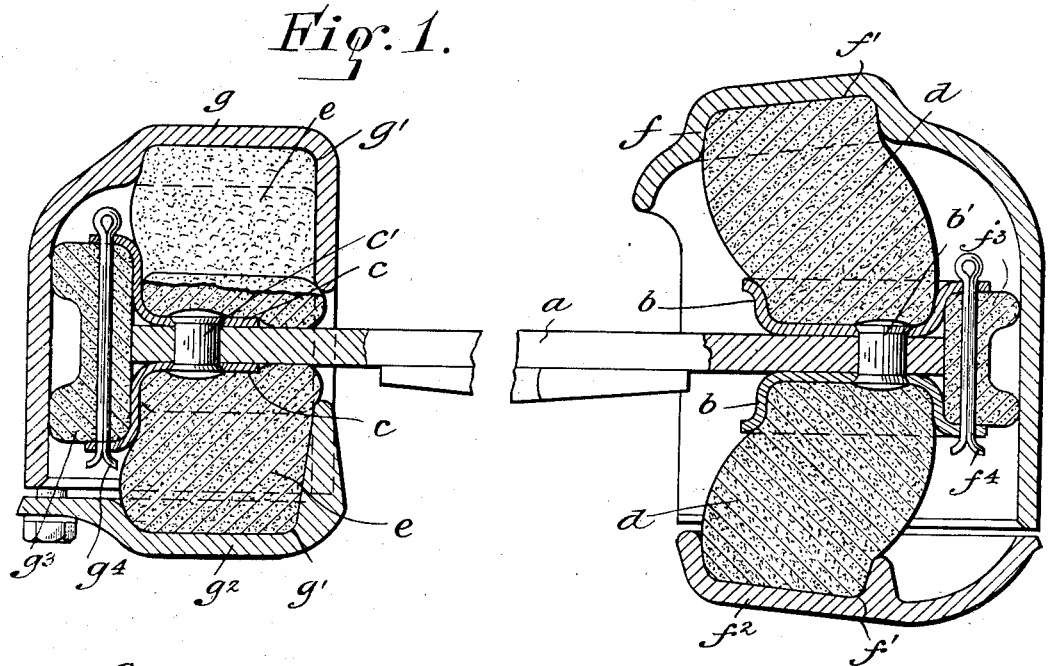
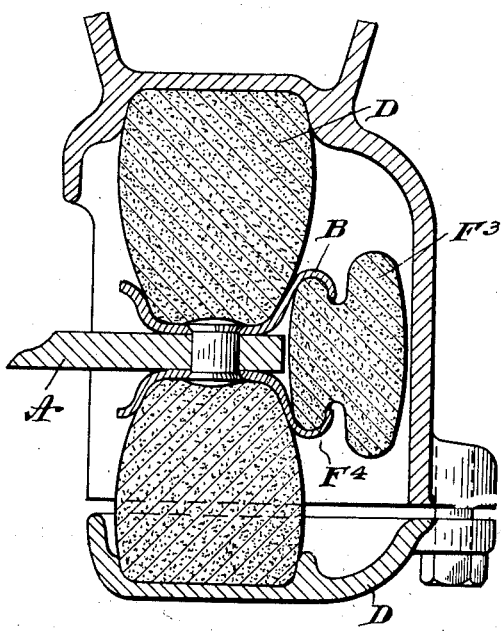

Patented Dec. 15, 1925.

UNITED STATES PATENT OFFICE.

1,566,026

AUGUST H. LEIPERT, OF COLLEGE POINT, AND JOHN GOLDSMITH, OF NEW YORK, N. Y., ASSIGNORS TO INTERNATIONAL MOTOR COMPANY, OF NEW YORK, N. Y., A CORPORATION OF DELAWARE.

CUSHION CONNECTION FOR VEHICLE CONSTRUCTION.

Application filed September 5, 1924. Serial No. 736,020.

*To all whom it may concern:*

Be it known that we, AUGUST H. LEIPERT and JOHN GOLDSMITH, citizens of the United States, residing at College Point, in the borough of Queens, and in the borough of Manhattan, of the city of New York, in the State of New York, respectively, have invented certain new and useful Improvements in Cushion Connections for Vehicle Construction, of which the following is a specification, reference being had to the accompanying drawing forming a part hereof.

This invention relates to improvements in cushion connections for vehicle construction and particularly those adapted for the connection of a vehicle spring to the chassis frame. In such connections a column of non-metallic yielding material is interposed operatively between each side of the spring and the frame so as to take the load and act as a connection as well as a support, each column usually being confined under compression. The columns themselves conform to elongating movements of the spring so that it may function in its intended manner. Under some conditions of use it might be necessary, and under others, at least desirable, to provide an additional column at one or both ends of the spring in the line of its movements of elongation which columns might yieldingly affect such elongating movements through predetermined ranges. For instance, such end columns might be effective to a greater or less degree at all times or at only such times as the elongation is of predetermined extent. The present invention relates particularly to the provision of such end columns as units independent of the supporting columns for the spring and, to means for maintaining such end columns in desired relation to the spring. The invention will appear with greater particularity in connection with a detailed description of the embodiment shown in the accompanying drawings, in which:

Figure 1 is a view partly in section and partly in elevation of a cushion connection for a vehicle spring and showing particularly the improved end columns carried permanently with the seats for the supporting columns of non-metallic material.

Figure 2 is a sectional view showing a somewhat modified form of end column.

Figure 3 is a sectional view showing still another modification in which the end column is carried by the housing rather than with the spring.

The invention is not concerned with the details of construction of the elements which are brought into association to afford the non-metallic connection and support for the spring except in so far as such connection has the characteristics of one afforded by the use of non-metallic yielding material. Figure 1 indicates somewhat conventionally a semi-elliptic spring *a* to the opposite ends of which seats *b*, *c*, are secured to the upper and lower sides thereof, respectively, as by rivets *b'*, *c'*. On these seats are columns *d*, *e*, of non-metallic yielding material such as rubber confined within housings *f*, *g*, respectively, carried on the vehicle frame in a manner which is now generally known and in use. These columns *d*, *e*, may be held against displacement by seats *f'*, *g'*, respectively, formed within the respective housings *f*, *g*, and opposed to the respective seats *b*, *c*, therein. The housings *f*, *g*, of course, are carried on the chassis frame of the vehicle. The caps $f^2$, $g^2$, for the respective housings *f*, *g*, when secured in place may serve to confine the columns of non-metallic material, such as rubber, under compression. The present invention is concerned with the provision of columns of rubber such as $f^3$, $g^3$, at the opposite ends of the spring *a* and within the respective housings *f*, *g*, said end columns serving to resist yieldingly elongating movements of the spring through certain ranges, that is to say, either from one extreme position to the other or at predetermined times. Such columns $f^3$, $g^3$, as appears from Figure 1 may be wholly independent of the respective columns *d*, *e*, and may be carried conveniently on the spring seats *b*, *c*. For instance, these spring seats may have their free ends so formed as to constitute seats which will receive the respective blocks snugly therein and cotter pins $f^4$, $g^4$, may be passed through the said seats and through the respective columns so as to hold them against bodily displacement. The form and dimensions of the said columns $f^3$, $g^3$, may be such with respect to the clearances in the respective housings as to result in these columns coming into effective relation to the supports for the cushion connections (in the instant case the walls of the housings $f$, $g$) and thereby resist yieldingly elongating movements of the spring $a$ through any desired ranges.

In the embodiment shown in Figure 2 parts corresponding to those heretofore described are to be found except that the end columns, one of which $F^3$ as illustrated, are so moulded as to present a bead $F^4$ which may be engaged with overturned ends of the seats B for the columns D. In such construction the end column $F^3$ may be engaged with and disengaged from the overturned ends of the seats B by endwise movement. Its action in resisting yieldingly elongating movements of the spring A is as before described.

In the form shown in Figure 3 it appears that an end column of yielding material indicated at $h$ may be seated in the support for the cushion connection (the wall of the housing F) and in such relation to the spring $a^x$ as to resist yieldingly elongating movements thereof through any desired ranges. Such a seat for the end column is indicated at F' and a retaining member to hold it against displacement is shown as a bolt $i$ extending through the column and through the wall of the housing F. The seats $B^x$ may be formed from a single piece of metal which is bent at its ends to present a relatively large bearing face B' to engage the end column for the purpose herein described.

It will be evident from the description that the invention is not to be limited to the precise form or dimension of the end column nor to the means by which it is maintained in effective cushioning relation between the spring and the supporting means for the cushion connection.

What we claim is:

1. In combination with the spring of a vehicle, non-metallic yielding means to support it and connect it to the chassis frame, and independent non-metallic yielding means operatively engageable by the end of the spring to resist yieldingly elongating movements thereof.

2. In combination with the spring of a vehicle, seats carried at its ends, non-metallic yielding material on the seats to support the spring and connect it to the vehicle frame, and independent non-metallic yielding material carried in operative relation to the said seats to resist yieldingly elongating movements of the spring.

3. In combination with the spring of a vehicle, seats carried at its ends, non-metallic yielding material on the seats to support the spring and connect it to the vehicle frame, additional seats formed from the first named seats by extending their ends on opposite sides of the end of the vehicle spring, blocks of non-metallic yielding material disposed within the last named seats, and means co-operating with said last named seats and with said block of material to hold the same against displacement and maintain it in effective position to resist yieldingly elongating movements of the spring.

4. In combination with a vehicle spring, housings into which its ends extend, blocks of rubber confined within the housings and engaging the ends of the spring to support and connect the same to the vehicle frame and separate blocks of rubber interposed operatively between the opposite ends of the spring and the walls of the housings to resist yieldingly elongating movements of the spring.

This specification signed this 3rd day of September A. D. 1924.

AUGUST H. LEIPERT.
JOHN GOLDSMITH.